(12) United States Patent
Hirsch

(10) Patent No.: US 7,131,780 B2
(45) Date of Patent: Nov. 7, 2006

(54) KEYBOARD

(76) Inventor: Steven B. Hirsch, P.O. Box 789, Middleburg, VA (US) 20118

( * ) Notice: Subject to any disclaimer, the term of this patent is extended or adjusted under 35 U.S.C. 154(b) by 0 days.

(21) Appl. No.: 10/650,825

(22) Filed: Aug. 29, 2003

(65) Prior Publication Data

US 2005/0058492 A1 Mar. 17, 2005

(51) Int. Cl.
*B41J 5/28* (2006.01)
(52) U.S. Cl. .................. 400/485; 400/486; 400/480; 400/489; 200/5 A; 200/5 B; 200/5 C
(58) Field of Classification Search ............ 400/485, 400/486, 480, 489, 472; 200/5 A, 5 B, 5 C; 341/22; 345/168
See application file for complete search history.

(56) References Cited

U.S. PATENT DOCUMENTS

| | | | |
|---|---|---|---|
| 1,652,464 A | 12/1927 | Tyberg | |
| 2,532,228 A | 11/1950 | Hesh | |
| 3,399,287 A | 8/1968 | Euler | |
| 3,633,724 A | 1/1972 | Samuel | |
| 4,201,489 A | 5/1980 | Zapp | |
| 4,256,931 A | 3/1981 | Palisek | |
| 4,440,515 A | 4/1984 | Nassimbene | |
| 4,449,839 A * | 5/1984 | Bleuer | 400/485 |
| 4,536,625 A | 8/1985 | Bebie | |
| 4,778,295 A * | 10/1988 | Bleuer | 400/485 |
| 4,896,003 A | 1/1990 | Hsieh | |
| 5,087,910 A | 2/1992 | Guyot-Sionnest | |
| 5,497,151 A | 3/1996 | Dombroski | |
| 5,528,235 A * | 6/1996 | Lin et al. | 341/22 |
| 5,564,560 A | 10/1996 | Minelli | |
| 5,661,505 A | 8/1997 | Livits | |
| 5,841,374 A | 11/1998 | Abraham | |
| 6,031,469 A | 2/2000 | Dodd | |
| 6,103,979 A | 8/2000 | Motoyama et al. | |
| 6,157,323 A | 12/2000 | Tso et al. | |
| 6,230,222 B1 | 5/2001 | Rush | |
| 6,348,878 B1 | 2/2002 | Tsubai | |
| 6,386,773 B1 * | 5/2002 | Mathias | 400/485 |
| 6,437,682 B1 | 8/2002 | Vance | |
| 6,520,699 B1 * | 2/2003 | Abe | 400/485 |
| D473,226 S | 4/2003 | Griffin | |
| 2001/0006587 A1 * | 7/2001 | Keinonen et al. | 400/472 |
| 2003/0193478 A1 * | 10/2003 | Ng et al. | 345/168 |
| 2004/0190968 A1 * | 9/2004 | Yang | 400/472 |
| 2005/0123333 A1 * | 6/2005 | Sugimura et al. | 400/485 |

* cited by examiner

FOREIGN PATENT DOCUMENTS

WO    WO 02/101531 A1    12/2002

*Primary Examiner*—Daniel J. Colilla
*Assistant Examiner*—Kevin D. Williams
(74) *Attorney, Agent, or Firm*—Fitch, Even, Tabin & Flannery

(57) ABSTRACT

A keyboard has a single row of eight multi-position keys with the letters arranged in a standard QWERTY keyboard configuration. The eight keys correspond to the eight fingers used when touch typing; each finger operates one key, and that key contains all the letters that the finger normally accesses when touch typing on a standard QWERTY keyboard. With this design, no finger has to move to a different key while typing. When depressed at different locations on its key face, each key either moves straight down, or down while tilting slightly about one of a plurality of axes. Three-position keys have two tilt axes and six-position keys have five tilt axes. The switches utilize contacts located on the bottom of the switches which may be conductive or nonconductive.

20 Claims, 16 Drawing Sheets

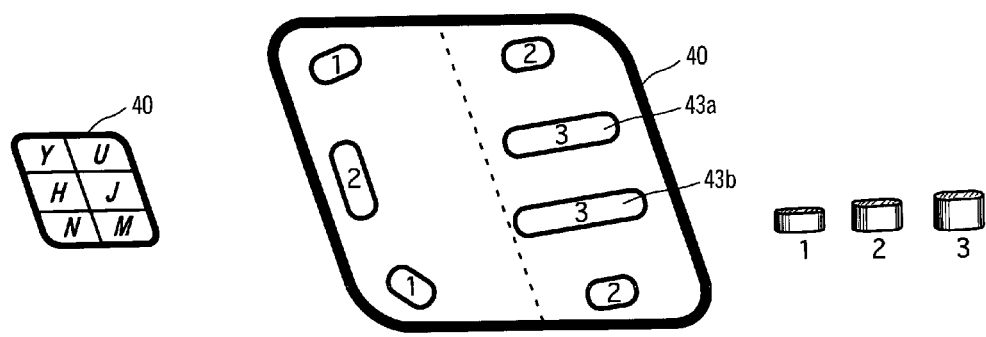
Fig. 4
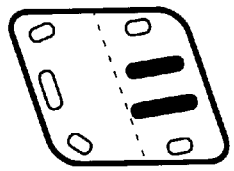 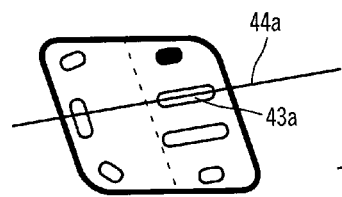 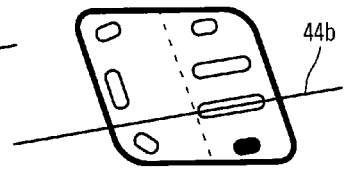
Fig. 4a  Fig. 4b  Fig. 4c
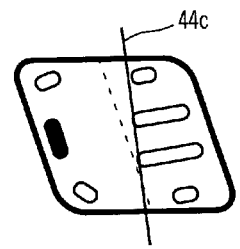 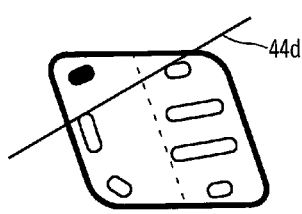 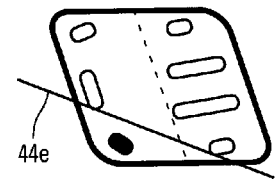
Fig. 4d  Fig. 4e  Fig. 4f

|  | Letter | | | | | | | | |
|---|---|---|---|---|---|---|---|---|---|
| Foot Number | J | J | J | J | U | M | H | Y | N |
| 1-2 | 0 | 0 | 0 | 0 | 1 | 0 | 0 | X | 0 |
| 2-3 | 1 | 1 | 1 | X | X | 0 | X | 0 | 0 |
| 3-3 | 1 | 1 | X | 1 | X | 0 | 0 | 0 | 0 |
| 4-3 | 1 | X | 1 | 1 | 0 | X | X | 0 | 0 |
| 5-3 | X | 1 | 1 | 1 | 0 | X | 0 | 0 | 0 |
| 6-2 | 0 | 0 | 0 | 0 | 0 | 1 | 0 | 0 | X |
| 7-1 | 0 | 0 | 0 | 0 | 0 | 0 | 0 | 1 | 0 |
| 8-2 | 0 | 0 | 0 | 0 | 0 | 0 | 1 | X | 0 |
| 9-2 | 0 | 0 | 0 | 0 | 0 | 0 | 1 | 0 | X |
| 10-1 | 0 | 0 | 0 | 0 | 0 | 0 | 0 | 0 | 1 |

1 = required contact
0 = required no contact
X = don't care

Fig. 6

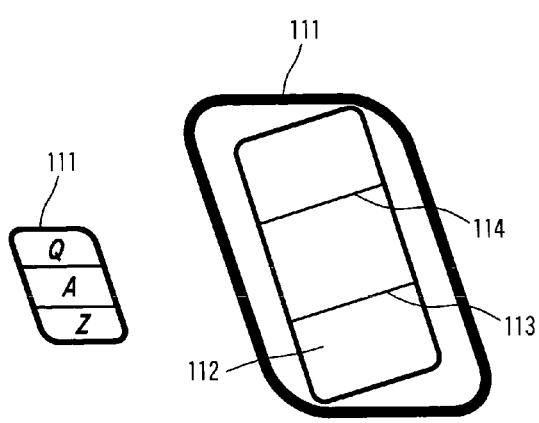
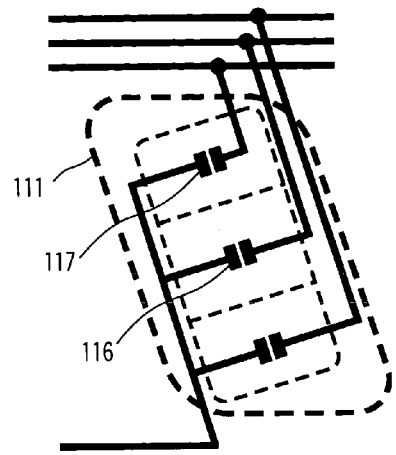
Fig. 11　　　　　　　　　　Fig. 11d
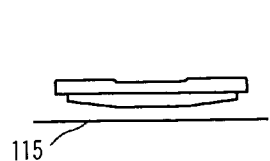
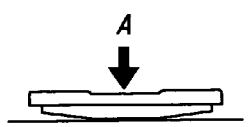
Fig. 11a　　　　　Fig. 11b　　　　　Fig. 11c

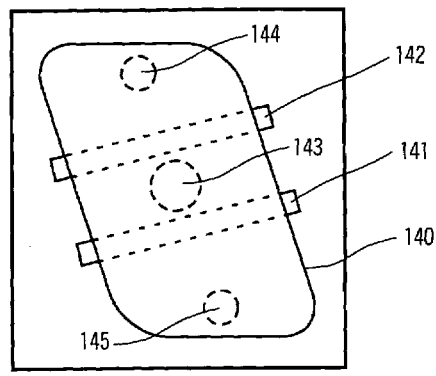
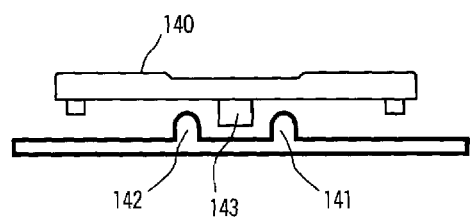
Fig. 14                    Fig. 14a
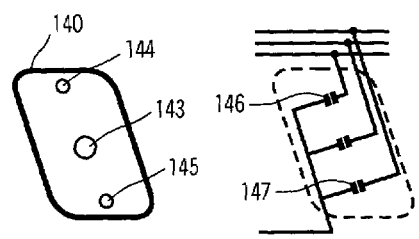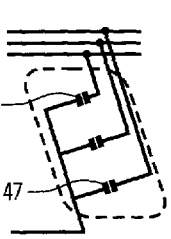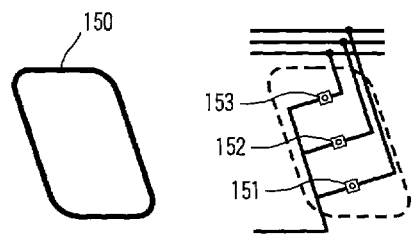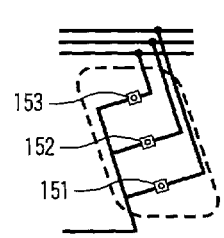
Fig. 14j    Fig. 14c        Fig. 14e    Fig. 14i

KEYBOARD

BACKGROUND OF THE INVENTION

1. Field of the Invention

The present invention is directed to a keyboard which may be used for a full-size computer keyboard, a laptop, notebook or tablet computer keyboard, a personal digital assistant (PDA) device keyboard, a smart display keyboard, a pocket translator or dictionary keyboard, or other device which utilizes an alphanumerical keyboard. The keyboard comprises an input device for any data or any information desired for any type of keyboard-compatible device. The keyboard more specifically relates to the standard QWERTY keyboard configuration which is most often used in touch typing. However, the keyboard configuration is not limited to the standard QWERTY keyboard layout. The invention considers the dexterity of the index fingers and other fingers used in touch typing.

2. Description of the Related Art

The standard QWERTY keyboard arrangement of letters is well known in the art. In accordance with standard QWERTY design, one key is used for each letter of the alphabet, as well as separate keys for numbers and other punctuation marks. In the use of such keyboards, the fingers are moved from individual key to individual key. When using a touch type system, the keys in the center row, or "home row," are considered to be home positions for the fingers, such as the letters J and F which are the home positions for the right and left index fingers, respectively. In the use of this type of prior art keyboard, each finger moves among various keys to access different letters during typing. Stated another way, a single key does not provide for multi-letter input, such as two inputs for two different letters from a single key.

It is also known in the prior art to provide single keys with a plurality of functions. The plurality of functions may be two, three, or even more. The plurality of functions may represent different letters which are outputted when a single key is pressed in different locations. In the prior art of this type, it is still required that there be more than eight keys to provide functions for the keyboard when using a standard QWERTY arrangement; meaning that at least some fingers must still move to different keys to access all the letters. Keyboards with a fewer number of keys and a greater number of characters per key are known, but these keyboards do not use the standard QWERTY layout and require the operator to learn an entirely different system of typing.

Still further, in the prior art, not all multi-function key designs provide for prevention of sending an incorrect signal when a key is pressed improperly. This may occur if a key is pressed improperly and there is closure of two sets of electrical contacts which send a computer device a signal that two letters have been struck simultaneously. Such simultaneous key strikes are possible in some of the known prior art, and should avoided.

In the prior art, many keyboard footprints are of such a large size, that they are not useable for small computer devices (PDAs, smart displays, pocket translators, etc.). Therefore, a small footprint is desirable in order to provide for utility with small portable devices.

In prior art, there are full QWERTY keyboards that are essentially "shrunk" to a smaller or miniature size to fit on portable devices; however, the inter-key spacings and overall size of these keyboards are too small to allow touch typing with all eight fingers, and the user is forced to type using the thumbs or only one or two fingers at a time.

SUMMARY OF THE INVENTION

This invention provides an alphabetical keyboard which is laid out in a standard QWERTY arrangement as shown in FIG. 1. When a touch typing system is used on a QWERTY keyboard, the fingers of the right and left hands each operate a certain group of keys on the keyboard. These key groupings are indicated on FIG. 1 by the arrows between each finger and the group of keys it operates when touch typing.

At the top of FIG. 1 there is shown a keyboard in accordance with this invention. In this keyboard, there are eight keys for the alphabet. Punctuation is at the lower portion of the right-hand three keys. In this arrangement, there are 6 three-position keys plus 2 six-position keys. Each key is operated by the finger which is dedicated to the letters on that key when touch typing using the standard QWERTY keyboard layout. However, with the keyboard of this invention, the operator need not remove any finger from a key. For instance, when operating the key containing the letters Q, A and Z, the small finger of the left hand may remain on the key at all times and merely move up and down and depress the key in the appropriate place for the appropriate letter. Similar single finger/single key operation is provided for the letters/punctuation marks W, S and X; E, D and C; I, K and comma; O, L, and period; and P, semicolon and slash.

The center two keys each are six-position key actuated switches. These six-position keys perform the functions of the twelve central keys of the standard QWERTY keyboard. For instance, the six-position key to the right-hand side contains the letters Y, U, H, J, N and M. It is the use of the six-position key that allows the index finger to remain on a single key and to provide for actuation of all six letters. The letter J on the right-hand six-position key would comprise a home position as it does in a regular QWERTY keyboard. The difference between the six-position key and six independent keys of a regular QWERTY keyboard is that the six-position key is all one key and that the finger need not move to other keys in order to provide for the six letter inputs. The finger is merely slid from one position to another—up, down or across the key, such as from J to Y, J to M, or J to H—and then depresses the key at the desired position. The six-position key comprising the letters R, T, F, G, V and B is operated in a similar manner to the six-position key for Y, U, H, J, N and M.

As shown in FIG. 1, the keyboard disclosed herein duplicates both the hand and finger positions of a standard QWERTY keyboard. It also duplicates the finger movements of touch typing on a standard QWERTY keyboard; in other words, the relative positions of the letters each finger operates are identical to a standard QWERTY keyboard.

Further, the inter-key spacing of the preferred embodiment of this invention is ¾ of an inch between key centers, the industry standard for full-size keyboards. This allows for true, two-hand touch typing, unlike other reduced-size or miniature QWERTY keyboards where smaller keyboard size and key spacing force the user to type using the thumbs or only one or two fingers at a time.

With the keyboard layout of FIG. 1, Applicant provides a QWERTY keyboard where each finger operates only one key, yet the keys have tactilely distinct, discrete activation positions which provide for unique input for each individual letter of the alphabet and certain punctuation.

Further, the disclosed keyboard duplicates the hand and finger positions, and also the finger movements, of a standard QWERTY keyboard, enabling a touch typist or a user familiar with a QWERTY keyboard to use this keyboard with no learning or re-training required.

Still further, by reducing a standard QWERTY keyboard to a single row of eight keys, the invention allows for true touch typing in small devices (such as a PDA or pocket dictionary), or in devices where space does not allow for anything but a very small keyboard, such as on the frame of a smart display or tablet personal computer.

The three-position and six-position key actuated switches of this invention duplicate the downward pressing motion of keys experienced with a standard typing keyboard. This is an important feature of the invention because it maintains the "feel" of a keyboard and avoids lateral sliding and/or pushing of the keys which are required in much of the prior art. Another important feature of Applicant's key actuated switches is that they have light actuation pressure which allows for fluid and continuous typing which is experienced on standard keyboards. Rapid typing speeds are also possible utilizing the key actuated switches of this invention. In all embodiments there is provided a very thin (low profile) design which requires a small under key depth for the keyboard. This allows for use in small devices and saves space in all applications of the key actuated switches.

Applicant, therefore, provides an alphabetical keyboard comprising a first group of six, three-position key actuated switches and a second group of two, six-position key actuated switches. The letter positions in this keyboard are arranged in a QWERTY keyboard pattern. The keys are arranged in a linear sequence from left to right as a first group of three, three-position keys followed by two, six-position keys followed by three, three-position keys. The two, six-position keys are positioned to be operated by the index finger of each hand of an operator when using a touch system commonly used for QWERTY keyboards.

The alphabetical keyboard has at least two, six-position key actuated switches which provide a different output signal when the key is:
1) pressed down at a first position where it does not tilt,
2) pressed downward at a second position where it tilts about a first substantially horizontal axis,
3) pressed downward at a third position where it tilts about a second substantially horizontal axis,
4) pressed downward at a fourth position where it tilts to one side about a substantially vertical axis,
5) pressed downward at a fifth position where it tilts diagonally about a first diagonal axis which is diagonal to both said first horizonal axis and said vertical axis, and
6) pressed downward at a sixth position where it tilts diagonally about a second diagonal axis which is diagonal to said second horizontal axis and said vertical axis.

In another embodiment, the invention may comprise a first group of five, three-position key actuated switches and a second group of three, six-position key actuated switches. In this embodiment, one of the three, six-position keys may include additional punctuation or symbols beyond that shown in FIG. 1 and be located at the right side of the keyboard where punctuation is normally located.

The three-position keys, when pressed down at the top or bottom, rock back and forth for upper and lower contacts, and move straight down when depressed in the center for a central contact. In the three-position keys, there is provision in all cases to prevent pressing of the key and causing a contact configuration which signals closure of multiple contacts which produce a signal to a device indicating that two letters have been selected simultaneously.

In the case of the six-position key, the key is configured to provide a plurality of pivot axes for the key. As the key pivots about different axes, different contacts close, producing different signals indicative of different letters.

The six-position key may also comprise a key having a plurality of feet on the bottom of said key which provide for pivot axes for said key and for circuit contact closure. The feet may be electrically conductive or nonconductive.

BRIEF DESCRIPTION OF THE DRAWINGS

FIG. 4 shows an alternative design to that shown in FIG. 2 wherein the conductive foot designated (23) in FIG. 2 is shown as (43a) and (43b) in FIG. 4.

FIG. 4a shows the conductive feet of FIG. 4 when contact is made with contacts (31) and (32) of FIG. 3.

FIGS. 4b–4f show the six-position key design of FIG. 4 in different positions where the key tilts about different axes depending upon where pressed.

FIG. 6 is a truth table showing foot numbers and requirements for contact to indicate a letter has been selected.

FIG. 11 shows a faceted electrically conductive foot on the underside of a three-position key.

FIG. 11a shows a side view of the key when there is no contact.

FIG. 11b shows the key when there is contact in the central portion.

FIG. 11c shows the key when there is contact at one side and tilting about a line between two facets.

FIG. 11d shows a contact set to be located beneath a key of FIG. 11.

FIG. 14 shows a three-position key which is supported by substrate supports. This key rocks on the substrate supports.

FIG. 14a shows a side view of substrate supports and key feet when the key is not depressed.

FIG. 14c shows contacts that may be located beneath the key (140) where the contact feet (143) (144) and (145) are conductive.

FIG. 14e shows a top view of a key (150).

FIG. 14i shows the location of contact switches (151), (152) and (153) beneath key (150).

FIG. 14j shows the three contact feet of key (140).

DETAILED DESCRIPTION OF THE EMBODIMENTS

Figure 1:
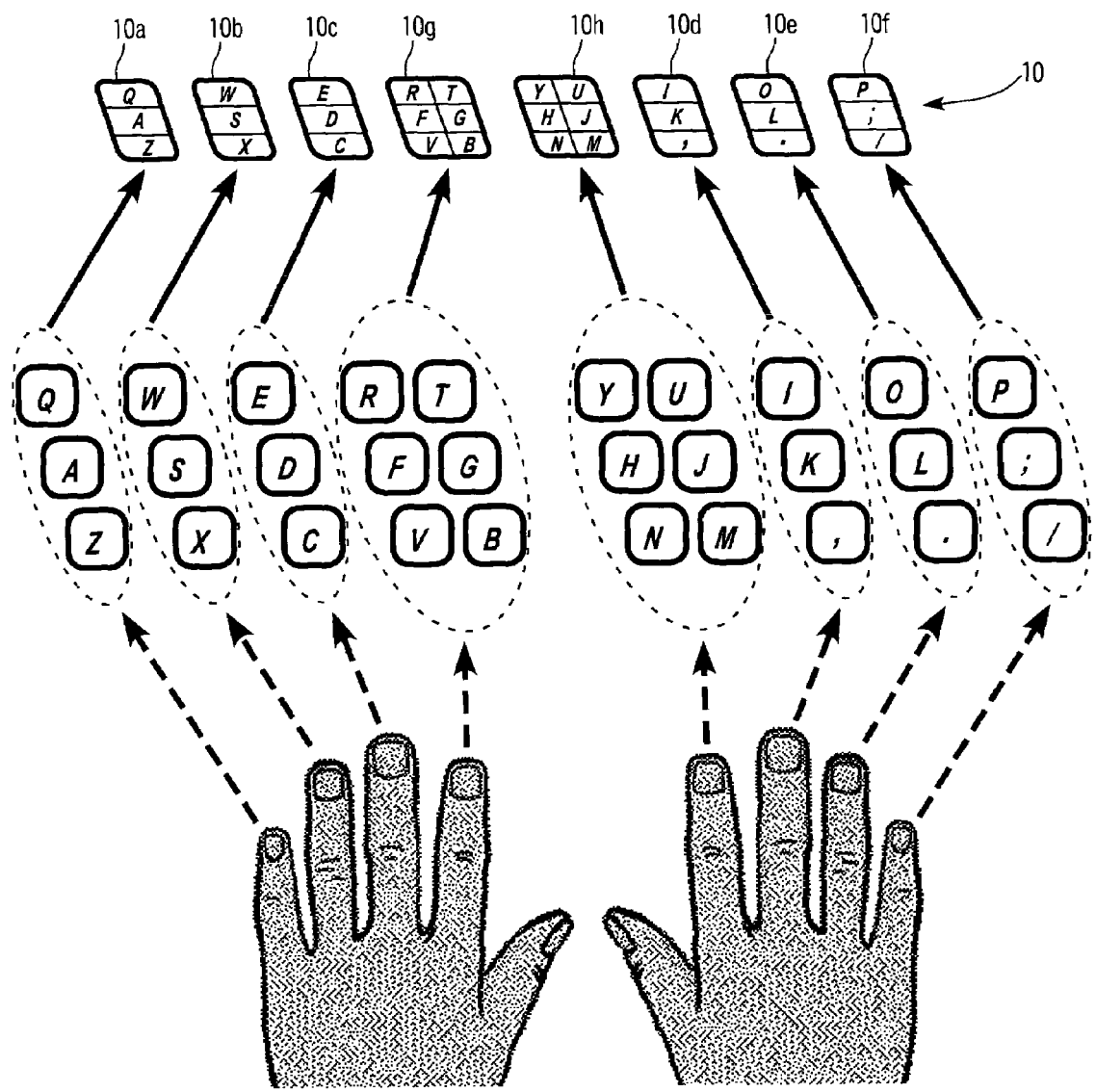
FIG. 1 shows an arrangement of six, three-position keys and two, six-position keys arranged in accordance with a standard QWERTY keyboard design. The letters and fingers designated for each key are shown.

FIG. 1 shows a keyboard (10) laid out in accordance with this invention. The keyboard (10) has a first group of three-position keys, (10a), (10b) and (10c) and second group of three-position keys (10d), (10e) and (10f). The keyboard further contains a third group of six-position keys. There are 2 six-position keys (10g) and (10h). The three-position keys, such as three-position key (10a) are constructed so that an operator's finger associated with the key need not be lifted from the key when typing. For instance, placement of the left hand small finger on the key (10a) at the position A allows the operator to slide the small finger up to the Q or down to the Z position from the central position A. In this manner, the finger need not leave the key, thereby providing for close placement of the letters or characters on a single key and avoidance of loss of finger position when one is using the touch typing system, normally associated with a standard QWERTY keyboard. As explained herein below, the mechanical embodiment of the key (10a) may change, but its primary function remains the same. The primary function is to provide a key which has three positions which are mutually exclusive, and which prevents closure of contacts for two letters or characters on the key at the same time, such as simultaneously making contacts for the letters Q and A which are next to each other on the key.

Keys (10g) and (10h) are six-position keys. These six positions correspond to the six letters normally actuated by the index fingers of each hand when one is using a QWERTY touch typing system. It is, of course, well known in the art of typing and keyboards that the standard is known as a "QWERTY" keyboard. Illustrated in FIG. 1 is a standard QWERTY keyboard as used with standard touch typing. In such a standard keyboard, the letters Y, U, H, J, N and M are actuated by the index finger of the right hand. In this invention, a single key (10h) is used to actuate these same six letters. The key (10h) is a six-position key allowing for actuation of each of the six letters associated with the key.

In order to provide for mutual exclusivity of the letters associated with the key (10h), the key is permitted to move in a different manner to actuate each letter. For instance, actuation of the letter J allows the key to move straight down when J is pressed. When U or M is pressed, the key will tilt about the upper or lower edge of the letter J to provide for contact at U and M, respectively. If the letter H is selected, the key will tilt about the left-hand edge of the letter J. Finally, if the letter Y or N is selected, the key will tilt about an axis associated with either Y and N where the axis is diagonal to the edges of the letter J. In this manner, the index finger will never be required to be lifted away from the key (10h). However, as it is moved from letter to letter and the finger presses down, the key will tilt about an axis as explained above. As the key tilts about different axes, different pairs of contacts or different contacts are made beneath the key. The tilting about the different axes acts to prevent more than one letter from being actuated at the same time when the key is pressed downward. For instance, tilting about an axis between the letters J and U will prevent actuation of contacts associated with the letter J when the letter U is pressed. This feature of the invention prevents double contact or false contacts of letters which are not intended if the finger is pressed down at a point which would put a downward force on both J and U simultaneously. If force is exerted between J and U, only one will be activated.

Since this keyboard is designed for a touch typing system, the index finger, such as the index finger of the right hand, need never be removed from the key (10h). However, the letter J will be considered to be a home position for the index finger of the right hand when using a touch typing system. Similarly the letter F would be a home position for the index finger of the left hand.

Also shown in FIG. 1 associated with the keys (10d), (10e) and (10f) are punctuation, such as comma, period, slash, and semi-colon. It is also well known that keyboards generally contain additional punctuation and symbols to the right hand side of the letter P. Therefore, the key (10f) may in an alternative embodiment be constructed as a six-position key instead of a three-position key. With a six-position key it is possible to provide, in addition to the letter P, semi-colon and slash, three additional punctuation marks or symbols, or six if used in conjunction with a shift key.

As illustrated in FIG. 1, the keyboard is explained with respect to the QWERTY touch typing system. However the standard touch typing method need not be used with this keyboard. For instance, the "hunt and peck" system may also be used with success with Applicant's keyboard. The keys provide for actuation of a single letter function when pressed down at a particular position. Therefore, one using a hunt and peck method may use a single finger to actuate many different keys, such as (10d) and (10e) and (10f) as well as (10h). Although "hunt and peck" has its limitations, it is to be understood that this invention is not limited to touch typing and it may be used with a hunt and peck system. Still further, the invention could be used with any other keyboard configuration of the letters and punctuation. However, since the QWERTY keyboard has become the standard, it has been used to illustrate this invention.

As shown in FIG. 1, the keys are arranged as a first group of six, three-position keys and a second group of two, six-position keys. The six-position keys are arranged at the center in order to be actuated by the index fingers of a person utilizing a touch typing method as learned on a standard QWERTY type keyboard.

Six-Position Key Actuated Switch

Embodiment 1

Figure 2:
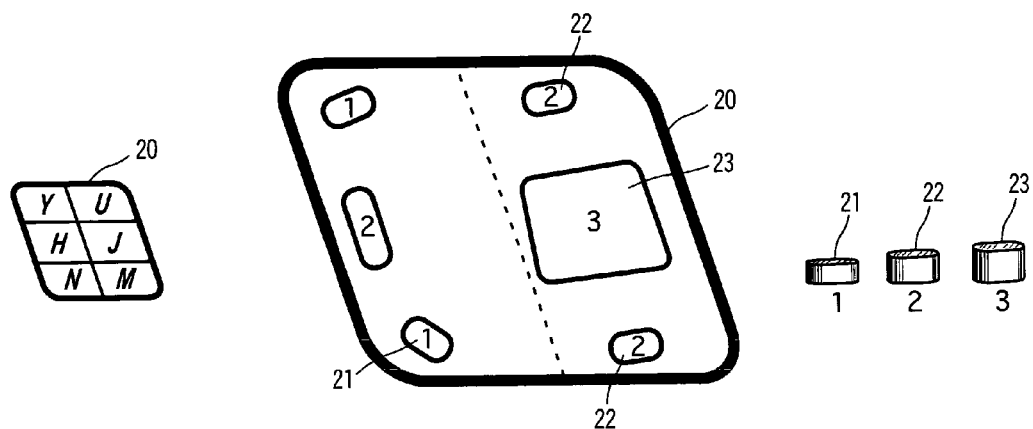
FIG. 2 shows a six-position key design utilizing conductive feet.
Figure 3:
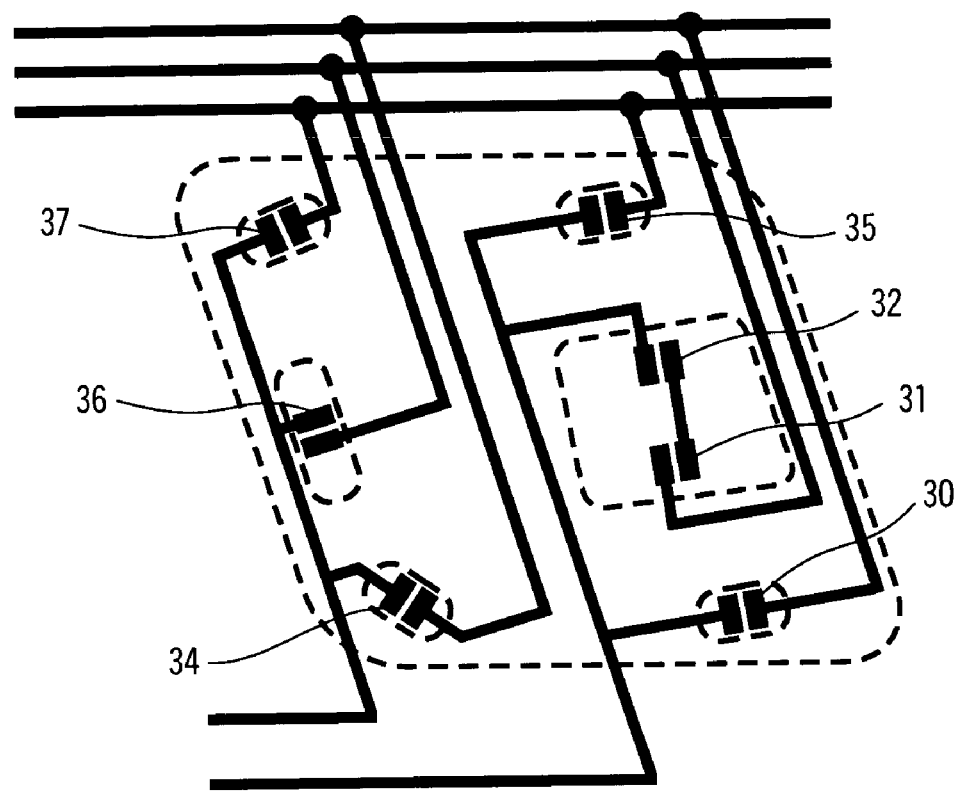
FIG. 3 shows contacts which may be used with the six-position key design of FIG. 2 where the contact pairs are closed by the conductive feet of FIG. 2.

FIG. 2 shows a first embodiment of a six-position key actuated switch. In this embodiment, there are six conductive contact feet on the bottom of the key 2. In order of ascending height, they are numbered 1, 2 and 3 respectively, as shown at the right side of key 20. Reference numeral (21) indicates the shortest height 1, reference numeral (22) indicates intermediate height 2, and reference numeral (23) indicates a greater height 3. The conductive contact feet having the three different heights shown in FIG. 2 provide for closure of switch contacts shown in FIG. 3. In FIG. 3, contact pair (30) is closed by the lower conductive foot (22) of FIG. 2. The contacts (31) and (32) are closed by conductive foot (23) of FIG. 2 and contact pair (34) is closed by a conductive foot (21).

Figure 2A:
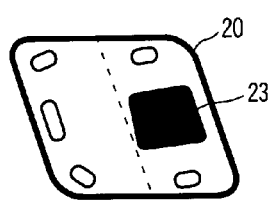
FIG. 2a shows the six-position key design where the conductive foot (23) forms closure of contacts (31) and (32) of FIG. 3.
Figure 2B:
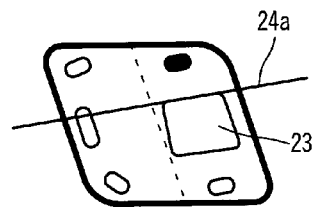
FIGS. 2b–2f show the six-position key design where the key tilts about different axes to provide for making of different contacts with conductive feet.
Figure 2C:
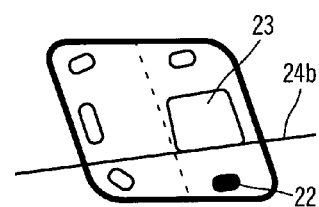
Figure 2D:
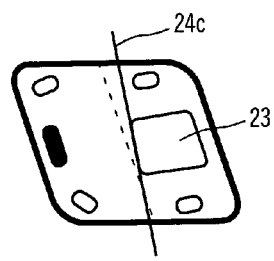
Figure 2E:
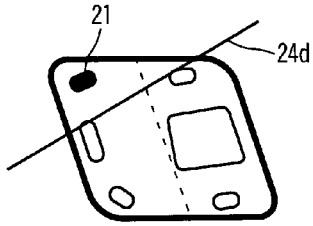

FIG. 2a illustrates key (20) when depressed at the letter J. In this position, the conductive foot (23) causes closure of contact pairs (31) and (32), see FIG. 3, which provides a signal from the keyboard that the letter J has been pressed. FIG. 2b shows closure of a contact foot having a height 2 (22) at the top right portion of the key. This corresponds to the letter U in the illustration. Pressing down at the top position for the letter U will cause closure of contacts (35) shown in FIG. 3 and a signal that the letter U has been selected will result. Reference numeral (24a) denotes a pivot line (tilt axis) for the key (20) when the letter U is depressed. The pivot line is provided by the upper edge of the conductive contact foot (23). The key rolls about this upper edge (24a). The action of the key rolling about the upper edge prevents closure of contacts (31) when the letter U is depressed. In this manner, there can be only one unique signal sent from the key upon pressure applied to the key at the letter U. FIG. 2c illustrates the key tilting about an axis (24b) which is defined by a lower edge of the conductive contact foot (23) when the letter M is depressed. This causes closure of contact pair (30) by foot (22). FIG. 2d illustrates tilting about an axis (24c) which is along the left hand side of conductive contact foot (23). When the key is depressed at the letter H, the key will tilt slightly about axis (24c) which is defined by a left side edge of the conductive foot (23). This prevents closure of contacts (32), (31) by conductive foot (23) and allows closure of contacts (36) by the conductive foot above it. FIG. 2e illustrates tilting of the key (20) about an axis (24d). Tilting about axis 24d is tilting about a diagonal axis. This tilting is possible because the conductive feet (22) (see FIG. 2) have an intermediate height which is higher than height (1) of foot (21) shown in FIG. 2e. Therefore, the key will tilt about axis (24d) and allow closure of contacts (37) by a foot (21). Again, closure at contacts (37) by conductive foot (21) in combination with tilting of the key prevents closure of other contacts, thereby preventing false or erroneous signals from the key. Stated another way, the closure of the switch contacts are all mutually exclusive, and cannot produce two signals indicative of two separate letters upon depressing of the key at a single place.

Figure 2F:
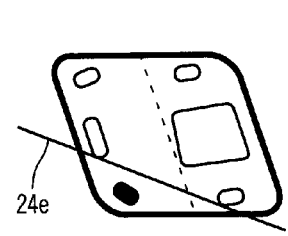

FIG. 2f is similar to FIG. 2e except that it shows tilting about an axis (24e) which produces contact at a location associated with the letter N by closing contacts (34).

Embodiment 2

FIG. 4 shows another embodiment similar to FIG. 2. The difference is that the contact foot (23) as shown in FIG. 2 is constructed as a pair of contact feet (43a) and (43b) as shown in FIG. 4. Key (40) is otherwise the same as key (20). When key (40) is pressed downward at the location J as shown in FIG. 4a, the contact feet (43a) and (43b) provide closure of contact pairs (31) and (32) of FIG. 3. FIG. 4b shows tilting about an edge of contact foot (43a) which acts like the upper edge of contact foot (23) shown in FIG. 2. This gives tilting about an axis (44a). It can easily be seen that axes (44b), (44c), (44d) and (44e) are defined by the different heights of the conductive contact feet in the same manner as that described with respect to axes (24b)–(24e) of FIGS. 2c to 2f.

Embodiment 3

Figure 5:
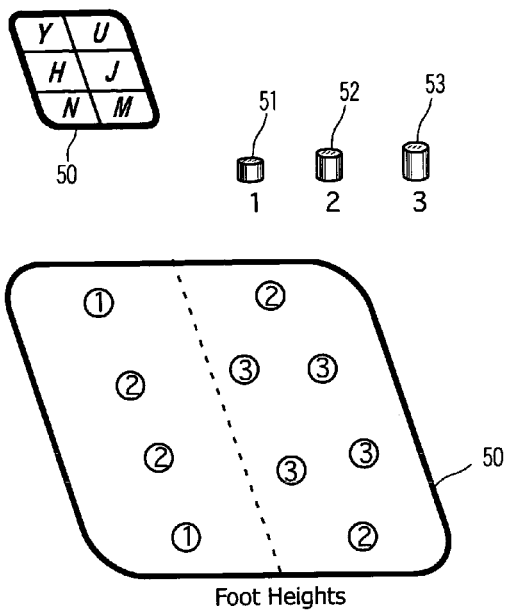
FIG. 5 shows a six-position key design where nonconductive feet are utilized with the height of the feet identified as 1, 2, 3.
Figure 5G:
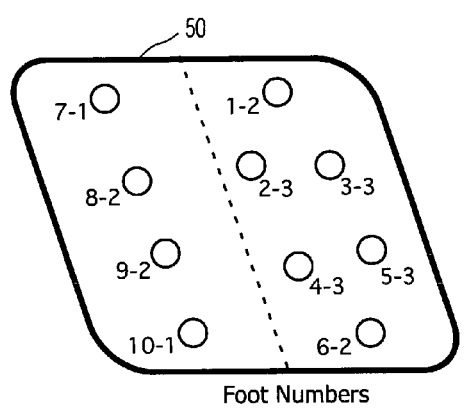
FIG. 5g is a diagram of all feet on the bottom side of the key identifying each foot. The first number for each foot indicates a foot number and the second number for each foot indicates its height.
Figure 5A:
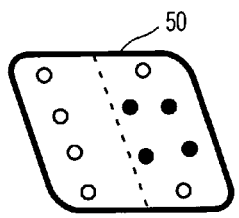
FIG. 5a shows the feet which are used to make circuit contacts when the letter J is pressed.
Figure 13A:
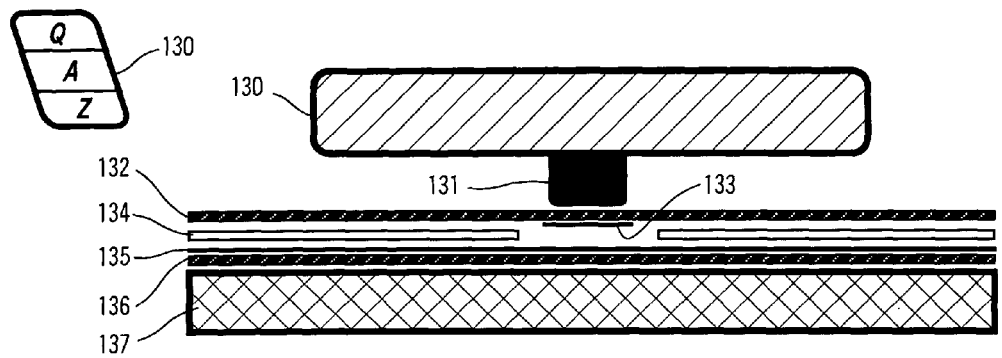
FIG. 13a shows a cross section of conductive traces and nonconductive layers for switching when nonconductive contact feet are used.

FIG. 5 shows a six-position key actuated switch (50) utilizing nonconductive contact feet. The nonconductive contact feet (51), (52) and (53) have different heights 1, 2 and 3 which allow the key to assume six unique positions depending upon the point (letter) at which the key is pressed downward. In this embodiment, the feet (51), (52), (53) are not electrically conductive. Instead, pressure down on the key at various locations corresponding to letters will result in closure of contacts placed below the key. Typical contacts located under key (50) are shown in FIG. 13*a*. FIG. 5*a* shows the key (50) when depressed at the J position. In this position the four long feet which have a length 3 denoted by reference numeral (53) are shown in black; these are feet 2-3, 3-3, 4-3 and 5-3 shown in FIG. 5*g*. The black in FIG. 5*a* indicates that it is these four feet which force closure of switch contacts below. Three of the four feet (2-3, 3-3, 4-3 and 5-3) are required to make a contact in order to signal the letter J.

Figure 5B:
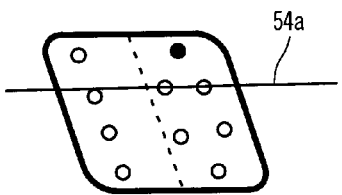
FIGS. 5b–5f show the key (50) in different positions where the key tilts about different axes to close different circuits.
Figure 5C:
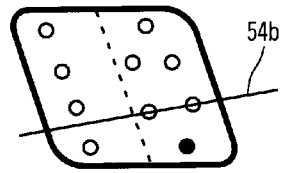

FIG. 6 shows a logic table for the contacts of the key (50) which would be programmed into the logic firmware or circuitry that the keyboard is connected to. The four conditions of the letter J show the three out of four contact closures for signaling J. Obviously, if four out of four contacts for J are made, any of the three out of four conditions is satisfied. In any event, the contact provided by the four black feet (2-3, 3-3, 4-3, 5-3) shown in FIG. 5*a* must provide a signal only when the letter J is pressed. In FIG. 5*b* there is shown the key (50) where the letter U is pressed. In this case, there must be contact produced by a foot (1-2) having a length 2 beneath the letter U (see FIG. 5*g*) which forces contacts to engage beneath the key (50). The contact feet such as (1-2) are shown on the left column of FIG. 6 which gives the conditions for the letter U. It is only when contacts associated with the black foot shown in FIG. 5*b* are connected that the letter U is possible. Still further, as shown in FIG. 5*b*, there is an axis (54*a*). The axis (54*a*) is drawn through the center line of the feet (2-3) and (3-3). However, it is understood that the axis actually passes through a point on the foot circumference. Therefore, when the key is pressed at the letter U, the key will tilt about the axis (54*a*) because the feet (2-3) and (3-3) are longer than the foot (1-2). FIG. 5*c* shows the key (50) when depressed at the letter M. Here, contact is made by the lower intermediate length foot (6-2) which is shown in black and contact occurs by closure of switch connections located beneath the key in response to pressure from contact foot (6-2). In this position, the key will tilt about an axis (54*b*) which runs through the center of the feet (4-3), (5-3) of length 3 located as shown in FIG. 5*c* and FIG. 5.

Figure 5D:
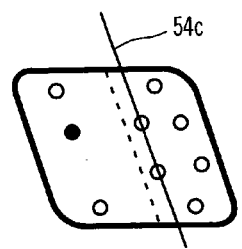

In FIG. 5*d*, there is provided for closure of two switches beneath feet (8-2) and (9-2) which have a length 2, and are shown in black in FIG. 5*d*. Closure of these switches is in response to pressing the letter H. Upon pressing of the letter H, the key (50) tilts about an axis (54*c*) which lies through the feet (2-3), (4-3) of length 3 as shown in FIG. 5*d*. This allows the key to tilt and provide contact via the two black feet. It should be noted that although contact would be provided with the feet through which the axis is drawn, this will not produce a response for the letter J because the logic table requires three of the four contacts beneath letter J to be connected (see FIG. 6).

Figure 5E:
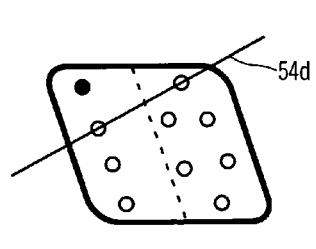
Figure 5F:
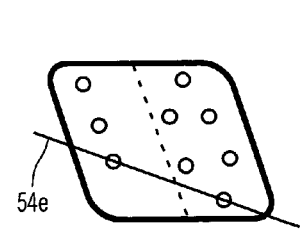

FIG. 5*e* shows the case where the letter Y is depressed. In this case, a short foot (7-1) beneath the letter Y causes a closure of switch contacts beneath the key (50) and tilting about an axis (54*d*) which passes through two feet (8-2), (1-2) each having a length of 2 as shown. Since closure of contacts beneath the black foot (7-1) shown in FIG. 5*e* is required, tilting about the axis (54*d*) which necessarily causes other contacts to connect, will not produce a signal for the letters H or U because as shown in Table 6, not all conditions will be met.

Embodiment 4

Figure 7:
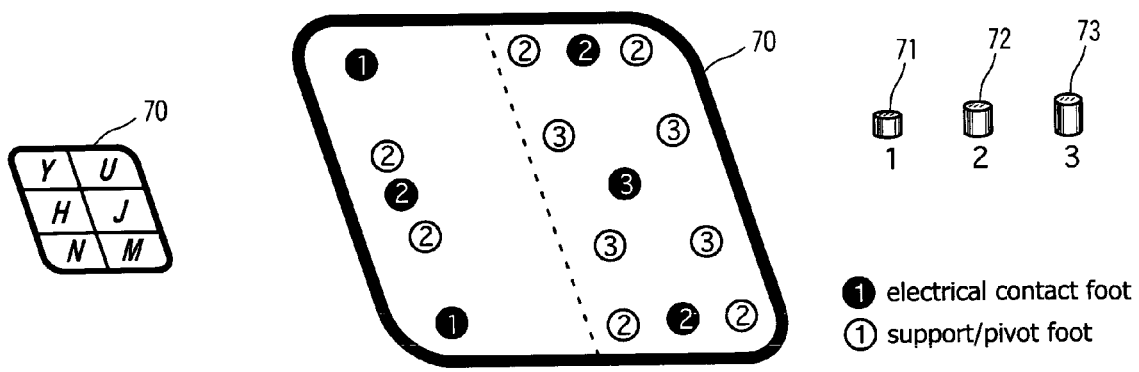
FIG. 7 shows a six-position key design which utilizes a combination of conductive electrical contact feet and non-conductive support/pivot feet. Also shown in FIG. 7 by number is the foot height.
Figure 7A:
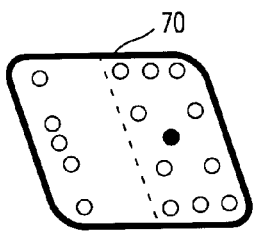
FIG. 7a shows the location of the single conductive contact foot utilized for signaling of the letter J.
Figure 7B:
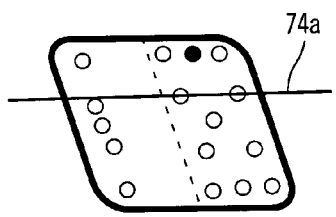
FIGS. 7b–7f show the required electrical conductive contact feet in black and the axes about which the key must tilt in order to provide for contact.
Figure 7C:
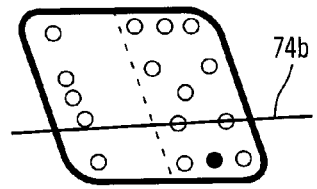
Figure 7D:
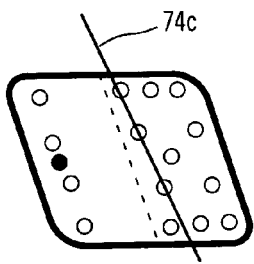
Figure 7E:
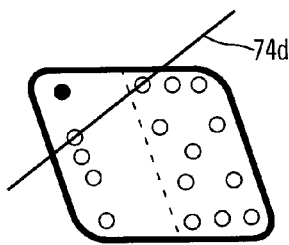
Figure 7F:
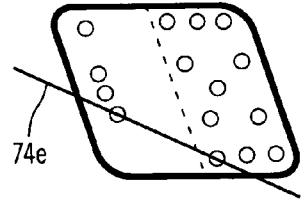
Figure 8:
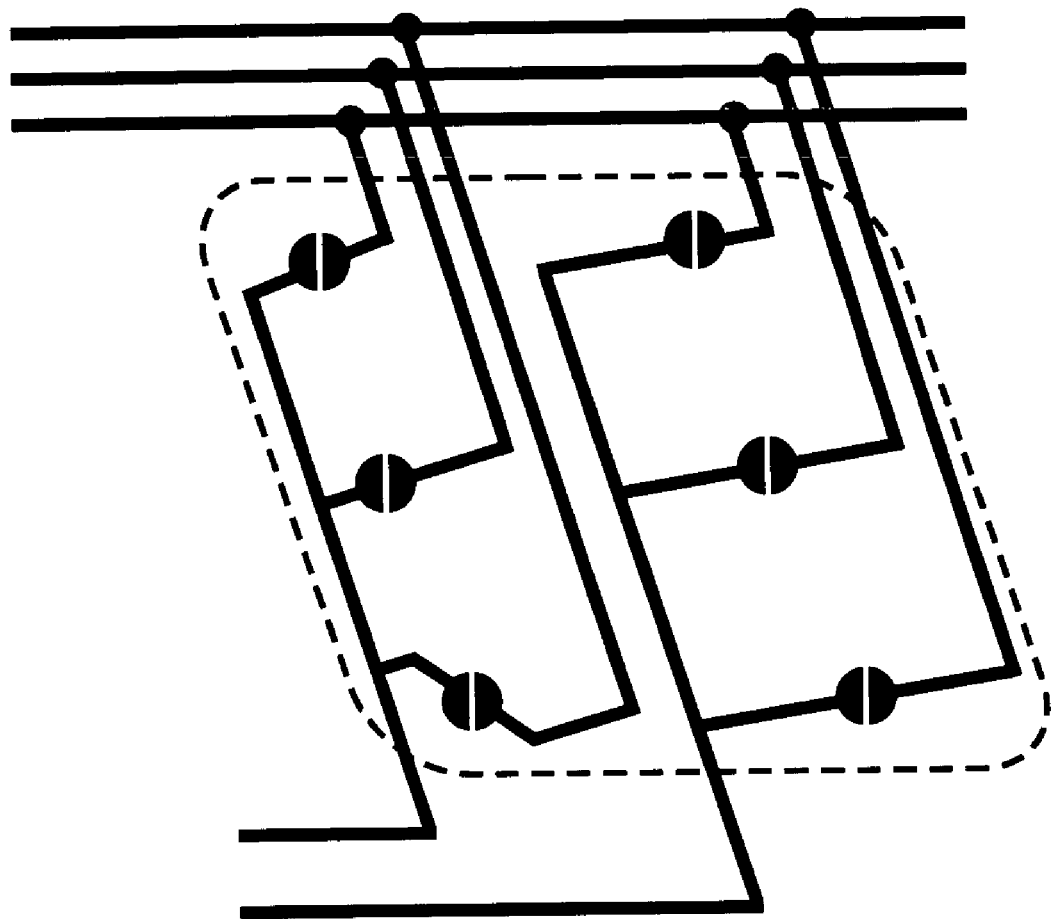
FIG. 8 shows a configuration of keys that may be used with the six-position key of FIG. 7 where contacts are made by the electrically conductive contact feet.

FIG. 7 shows another embodiment of a six-position key actuated switch which utilizes a combination of support/pivot feet and electrical contact feet. In this embodiment the support/pivot feet provide for pivoting and movement of the key (70) about the axes (74*a*)–(74*e*) shown in FIGS. 7*b*–7*f*. The key has the same configuration as that shown in FIG. 5 which is that for the letters Y, U, H, J, N and M normally touched by the right index finger utilizing a QWERTY touch typing method. In this embodiment, when key (70) is pressed straight downward at the point J, a long contact foot (3) may engage electrical contacts or a switch located there beneath as shown in FIG. 8. Only the foot beneath the letter J will make contact because the feet (3) remain higher than the feet (2) and (1). This condition is also shown in FIG. 7*a*. In FIG. 7*b* there is shown the case where the key is pressed at the letter U. Here the key (70) will tilt about feet 3 which lie between J and U, thereby preventing any contact that might be made by the contact foot (3) beneath J. On the other hand, tilting about (3) allows contact to be made by contact foot (2) beneath the letter U shown in black in FIG. 7*b*. This is shown as tilting about an axis (74*a*) in FIG. 7*b*. In FIG. 7*c*, there is shown actuation of the key (70) when the letter M is pressed. Here there is tilting about the lower feet (3) associated with the letter J which produces tilting about an axis (74*b*) as shown in FIG. 7*c*. This allows contact beneath the intermediate length contact foot (2) which is black in FIG. 7*c* without engagement of contact foot (3) located beneath the letter J. In FIG. 7*d*, there is shown closure of a switch when the letter H is pressed. Here a foot also having a length (2) is shown as a black foot in FIG. 7*d*. This foot causes electrical contact while its associated feet (2) which are support/pivot feet do not produce electrical contact. The electrical contact may be made by an electrically conductive contact foot, or by pressing down an electrical contact in a surface beneath. As shown in FIG. 7*e*, there is tilting about a pair of feet (2) (seen in FIG. 7) where the feet (2) are support/pivot feet associated with the letters H and U. In FIG. 7*e* there is shown closure of the switch when the letter Y is pressed. Here, the key is allowed to tilt about a pair of pivot feet having a length (2). One of these pivot feet is associated with the letter H and the other is associated with the letter U as shown in FIG. in 7*e*. As the key tilts about the axis (74*d*), closure of the switch is made by the short contact foot (1) shown in black FIG. in 7*e*. This is also a black foot shown in FIG. 7. Since (1) is a shortest length, there will be no other contacts made by the key when pressed at the letter Y. FIG. 7*f* shows a similar contact arrangement for the letter N which has a diagonal pivot line running through feet of lengths (2). The feet of length (2) indicated in FIG. 7 are associated with the letters H and M as shown in FIG. 7. Since the black foot shown in FIG. 7*f* is a short foot, only this foot will provide for electrical contact. Tilting is about axis 7*e*.

FIG. 8 shows a set of six contacts and buses which may be used to provide for switching with the key of the embodiment shown in FIG. 7. Here, six simple switches are shown. These switches may either be pairs of contacts which are closed by electrically conductive feet as in FIG. 3, or they may be switches constructed on electrical substrates of the type which are described in FIGS. 12*a* and 13*a* with respect to three position switches for purposes of simplicity.

Three-Position Key Actuate Switch

Embodiment 1

Figure 9:
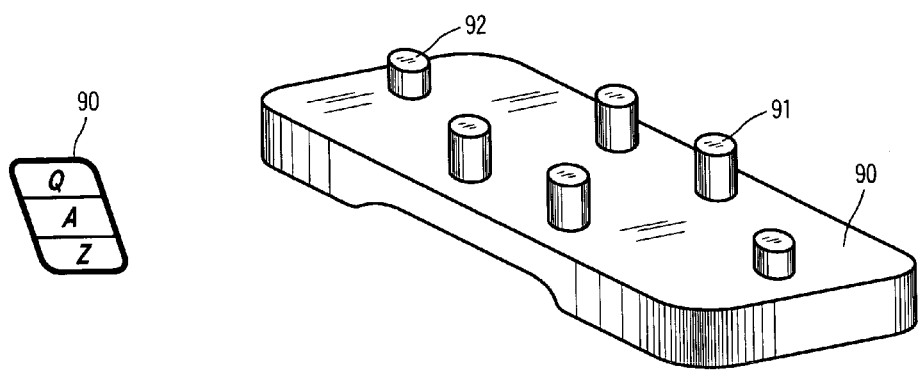
FIG. 9 shows a three-position key.
Figures 9A, 9B, 9C, 9D:
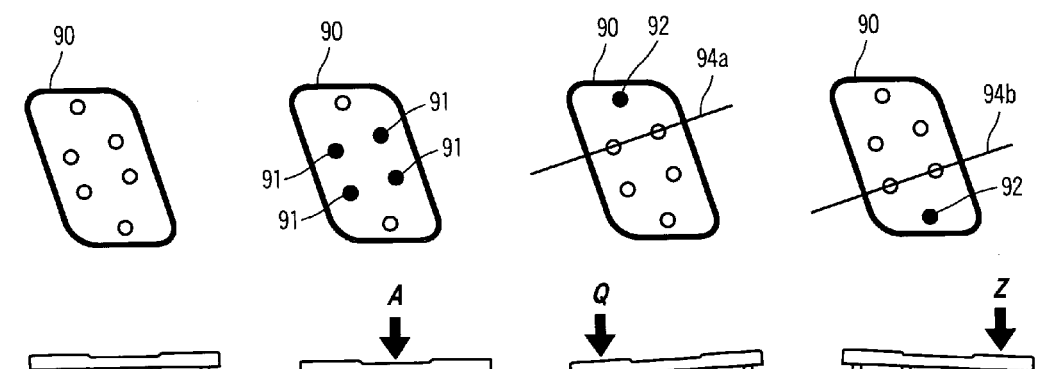
FIG. 9a shows a side view of the three-position key when it is not depressed.
FIG. 9b shows the three-position key when depressed at the letter A.
FIG. 9c shows the three-position key when depressed at the letter Q and tilted about axis (94a).
FIG. 9d shows the three-position key when pressed at the letter Z with tilting about an axis (94b).

FIG. 9 shows a three-position key actuated switch of the type generally illustrated in FIG. 1 as keys 10a–10f. The key (90) is a key which may be used for the letters Q, A and Z. The key (90) has two groups of feet. There is a central group of four feet (91) which are all of the same length and which are longer than a second group of feet (92) which are located close to the top and the bottom edges of the key (90). FIG. 9a shows the positions of the feet beneath the key, and a side view when the key is not pressed down. FIG. 9b shows the key when pressed down at position A. In this position, the operative contact feet (91) are shown in black. Three of the four contact feet (91) are required to complete a circuit either by the conductive foot method or by closure of switches by the foot. When three of the four closures that are required for registering of the A keystroke occur, the letter A is signaled. In FIG. 9c there is shown the key when in a position where the letter Q is pressed. Here a contact foot (92) shown in black is pressed downward for the letter Q causing closure of a switch or completion of contacts. Also shown in FIG. 9c is a tilt axis 94a which passes through point of contact of the feet (91) at the top side of the letter A. When there is tilting along axis (94a), there is necessarily contact by the two upper feet (91) of the letter A; however, this is not a condition where the letter A is registered because A requires registry of at least 3 out of 4 of those feet. Therefore, the key may tilt about contact feet as shown in FIG. 9c in order to allow closure by the contact foot beneath the letter Q. In FIG. 9d there is shown the key (90) when depressed at the letter Z. Here, the key tilts about an axis (94b) which is defined by the two feet (91) located along the bottom portion of the letter A. Since feet (91) are longer than foot (92) shown in black in FIG. 9d, there will be tilting about axis (94b) causing closure by the short contact foot (92) beneath the letter Z. This is a unique signal for the letter Z because the letter A cannot be registered since 3 out of its 4 contacts are not completed.

In the embodiment shown in FIG. 9, the structure located beneath the key (90) may be either switches which are closed by pressure from the feet (91) and (92) or it may be contact pairs which are closed if feet (91) and (92) are conductive.

Figure 10:
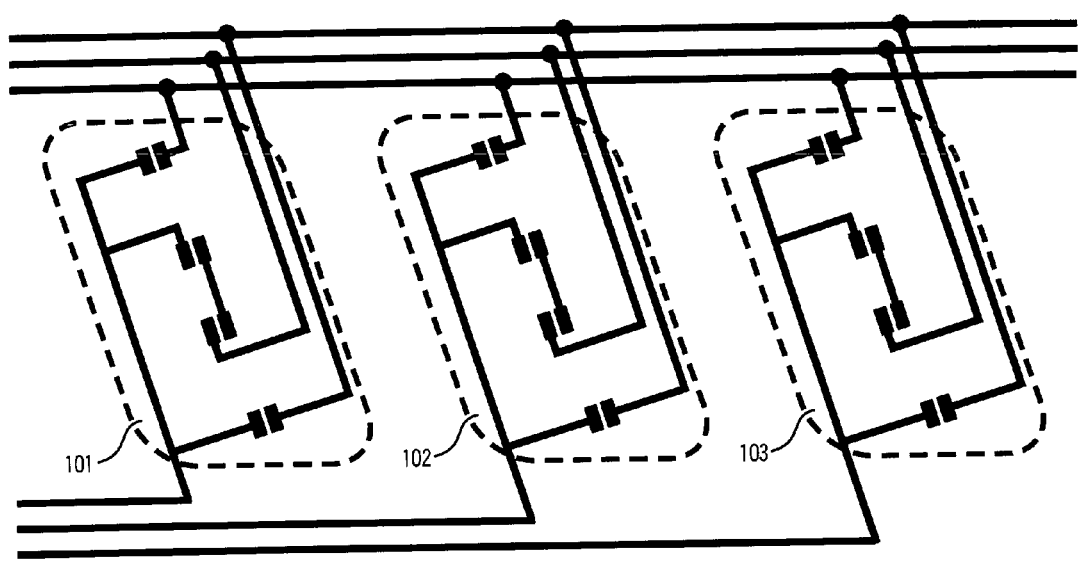
FIG. 10 shows electrical contacts which may be completed by contact feet of the type shown in FIG. 12c where the feet are electrically conductive.

FIG. 10 shows contact pairs located on a substrate. Contacts (101) may be used beneath key (10a), contacts (102) may be used beneath key (10b) and contacts (103) may be used beneath key (10c) in FIG. 1. Similar arrangements of contacts and busses may be used for the rest of the three-position keys utilized on the keyboard (10).

Embodiment 2

FIG. 11 shows another embodiment of a three-position key actuated switch. In this embodiment, there is a single conductive rubber foot with angled facets located on the underside of the key (111). The foot (112) has pivot edges (113) and (114) which allow the key to tilt or rock back and forth in response to pressure applied at different points. As shown in the side view of FIG. 11a, when no pressure is applied to the key, the key remains above a contact surface (115) located beneath it. On the other hand, when the key is pressed at a point for the letter A, the key moves straight down and closes contacts (116) located directly beneath this center section or facet of the key as illustrated in FIGS. 11d and 11b. When the key is pressed at a top portion, such as for the letter Q, the key will tilt about a pivot axis as shown in FIG. 11c, making contact at contact pair (117) when the upper facet moves downward.

Embodiment 3

Figure 15:
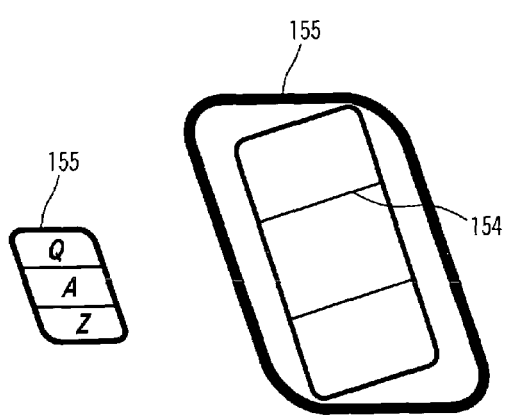
FIG. 15 shows a faceted nonconductive three-position switch foot.
Figure 15D:
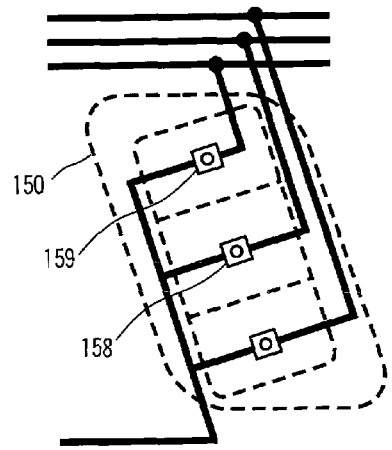
FIG. 15d shows a diagram of switch contacts (158) and (159).
Figure 15A:
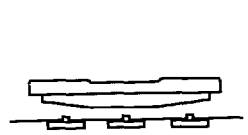
FIG. 15a shows a side vies of the key located in a non-depressed state.
Figure 15B:
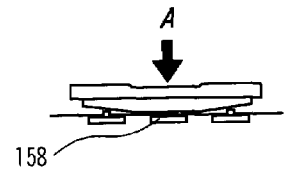
FIG. 15b shows the key depressed closing contact (158).
Figure 15C:
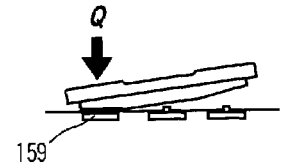
FIG. 15c shows the key depressed at the top closing contact (159).

FIG. 15 shows another embodiment where a rocking type single foot is used, but the foot is nonconductive. This is shown in FIGS. 15a to 15d. Here the contacts lie beneath the facets of the key (155) and, as shown in FIG. 15b provide for closure at the center contact when the key is pressed straight down at a point for the letter A. This contact is illustrated in FIG. 15b and is identified as reference numeral (158). When the key is pressed at the letter Q the key will tilt about a pivot line (154) allowing closure at a contact (159) which is shown in FIG. 15c.

Embodiment 4

FIG. 14 shows another embodiment of a three-position key actuated switch (140). In this embodiment pivoting of the key (140) is provided on substrate supports (141) and (142). The key as shown in the side view of FIG. 14a has a central foot (143) which moves downward between supports (141) and (142) to make contact with a circuit below. The circuit below may be closed by a conductive contact foot (143), or by pressure when the foot causes contact in substrates with conductive traces. Next, as shown in FIG. 14j, there are two additional contact feet located at the top and the bottom of the key which are (144) and (145). There may be the letters A, Q and Z for key (140). As shown in the side view of FIG. 14b, when no pressure is exerted on the key (140), no contact is made with the substrate to close switches or contact pairs which are shown in FIG. 14c. When the letter A at the center of the key is pressed, contact is made as shown in FIG. 14k. When a letter such as the letter Q is pressed, the key (140) tilts down (to the left as shown in the side view of FIG. 14d) causing the central contact foot to rise and the contact foot (144) beneath the letter Q to fall and cause contact with a pair of contacts (146) located beneath the foot (144). These are the contacts (146) as shown in FIG. 14c. In this position, the key tilts about support (142) in response to pressure applied at the top, and prevents closure of two contacts at one time. Contacts (147) are closed by foot (145) when the letter Z is pressed.

Figure 14B:
FIG. 14b shows the key when not depressed.
Figure 14F:
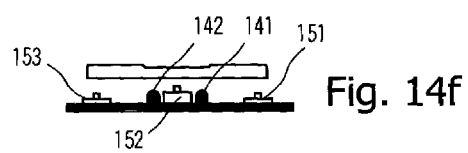
FIG. 14f shows a side view of key (150) which is in an open position.
Figure 14K:
FIG. 14k shows the key (140) when depressed at the center.
Figure 14G:
FIG. 14g shows a side view of key (150) when depressed at the center, thereby causing closure of a contact (152).
Figure 14D:
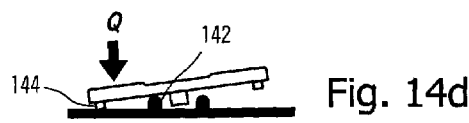
FIG. 14d shows the key (140) when pressed down at the top.
Figure 14H:
FIG. 14h shows the key (150) when depressed to close contact (153).

FIG. 14e shows another embodiment (150) of the key which is reference numeral (150). In this embodiment, key (150) has no feet on its under surface. Instead there are supporting substrate push action switches (151) (152) and (153). These are shown in FIG. 14i and in the side view of FIG. 14f. When the key (150) is pressed downward either at the center or at the top or bottom, it will tilt about supports (141) and (142) to cause closure of one of switches (151), (152) or (153) as shown in FIGS. 14g to 14i.

Conductive Contacts

Figure 12A:
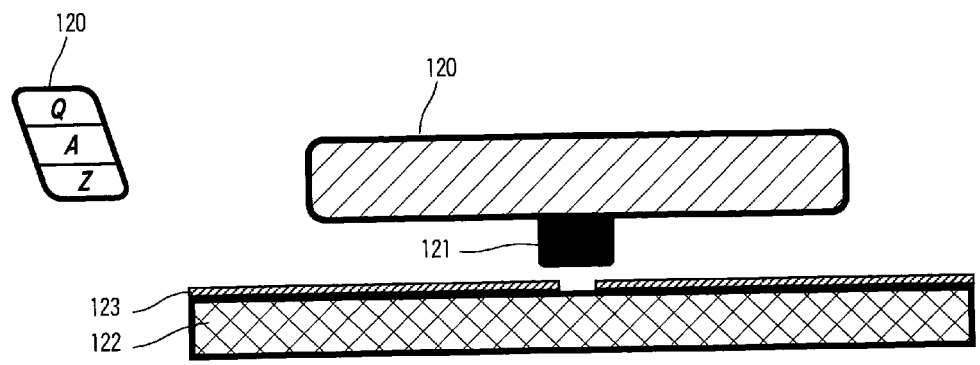
FIG. 12a shows a design for a three-position key (120) switching arrangement designed for a conductive rubber contact foot with the key in an open position and copper traces on a substrate.
Figure 12B:
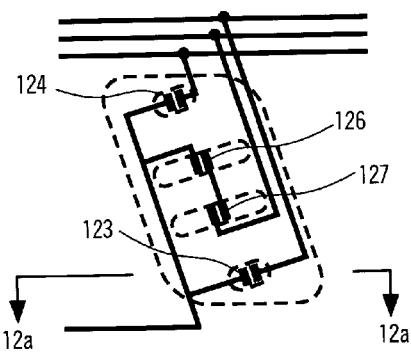
FIG. 12b shows a top view of the copper traces of FIG. 12a, with the key and conductive feet outlines shown in dotted lines.
Figure 12C:
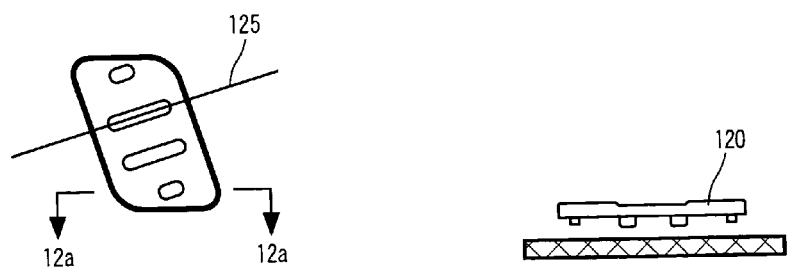
FIG. 12c shows the conductive feet of a key which provides for tilting about an axis (125) when a top portion of the key is pressed.
Figure 12D:
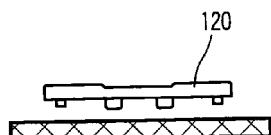
FIG. 12d shows a side view of a key (120).

FIG. 12a shows a conductive contact foot embodiment of a three-position key actuated switch. The conductive contact feet may be conductive rubber. FIG. 12a shows a key (120) which may be a key (10a) for the letters Q, A and Z. The conductive rubber contact foot (121) is on the underside of key (120). A substrate (122) is placed beneath the key and copper traces (123) are placed upon the substrate to provide conductive paths for sending signals. A typical pattern for copper traces is shown in FIG. 12b. FIG. 12b shows the pairs of copper trace contacts, such as pair (123) which are closed by contact with rubber contact feet, such as a contact foot (121) shown in FIG. 12a. FIG. 12d shows a side view of the key (120) which shows that the central contact feet are longer than those at the top and the bottom. The central contact feet lie beneath the letter A while those at the top and the bottom lie beneath the letters Q and Z respectively. This provides for pivoting of the key about the axis such as axis (125) shown in FIG. 12*c* when the letter Q is pressed. Since the key tilts about axis (125) the output signal for Q will be unique because there cannot be closure of both of contacts (126) and (127) depicted in FIG. 12*b*.

Nonconductive Contacts

Figure 13D:
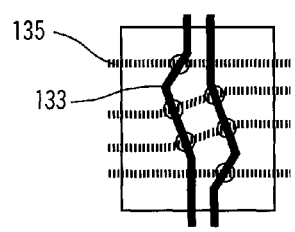
FIG. 13d shows a matrix of conductive traces which will lie beneath a key and which will provide output when traces are pressed together.
Figure 13E:
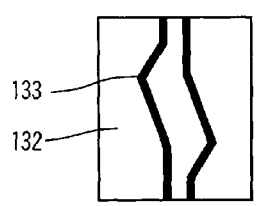
FIG. 13e shows a top nonconductive layer and conductive traces.
Figure 13F:
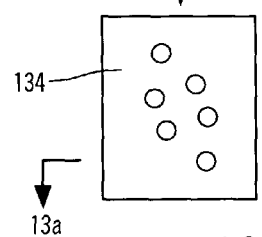
FIG. 13f shows a spacer with holes for the feet to press conductive traces together.
Figure 13G:
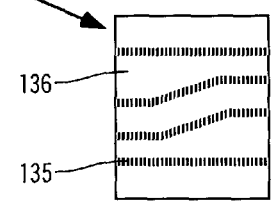
FIG. 13g shows a bottom nonconductive layer having conductive traces.
Figure 13B:
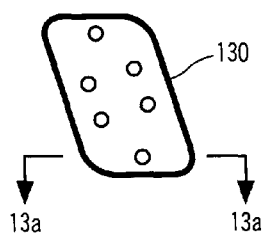
FIG. 13b shows the nonconductive feet of a key.
Figure 13C:
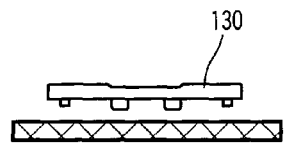
FIG. 13c shows a side view of a key.

FIG. 13*a* shows an embodiment of a three-position key actuated switch where the contact feet (131) on the underside of the key are nonconductive. FIG. 13*a* shows a key (130) having a contact foot (131) which presses downward when the key is depressed. The structure beneath the key has a first flexible nonconductive top layer (132) against which a nonconductive contact foot (131) is pressed when the key is pressed. This top nonconductive layer prevents contamination of the contact substrates beneath, and provides a surface upon which a conductive trace (133) layer may be placed. In this embodiment, a top conductive trace (133) is placed upon the bottom of the top nonconductive layer (132) and beneath the contact foot (131). Next, a nonconductive spacer (134) is placed beneath the nonconductive layer (132). The purpose of the spacer is merely to prevent contact when the key (130) is not pressed downward to cause engagement of conductive traces (133) and (135). Conductive trace (135) is located beneath the nonconductive layer (134) and may be applied to a support substrate (137) or placed on a nonconductive layer (136). When the contact foot (131) is pressed downward from the position shown in FIG. 13*a*, the trace (133) will move downward to engage trace (135) thereby completing closure of the contacts. FIG. 13*b* shows a view of the feet of key (130). FIG. 13*c* shows a side view of key (130) with the feet having different lengths. FIG. 13*d* shows a matrix of conductive traces (133) and (135) which provide for closure of circuit contacts when the key (130) is pressed. FIGS. 13*e*, 13*f* and 13*g* show details of the three nonconductive layers shown in FIG. 13*a* which are the top nonconductive layer (132) with conductive traces (133), the spacer (134) and the bottom conductive traces (135) on the bottom nonconductive layer (136).

Figure 16:
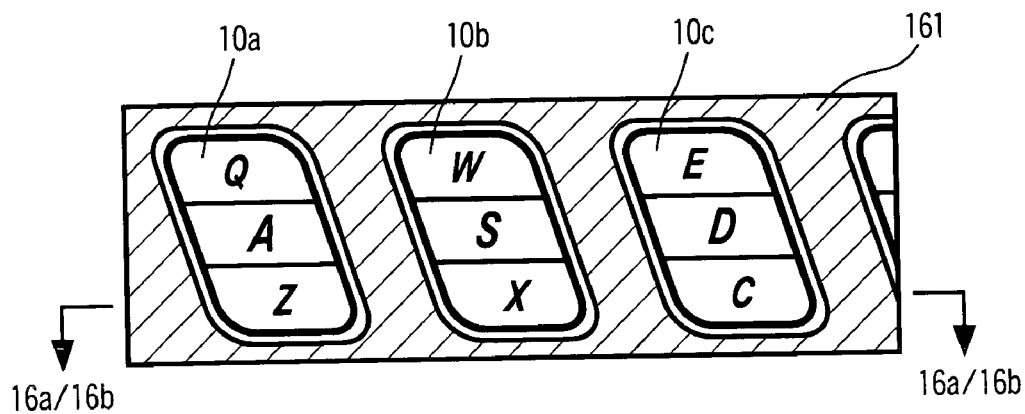
FIG. 16 shows the keyboard of FIG. 1 further including a top face plate.
Figure 16A:
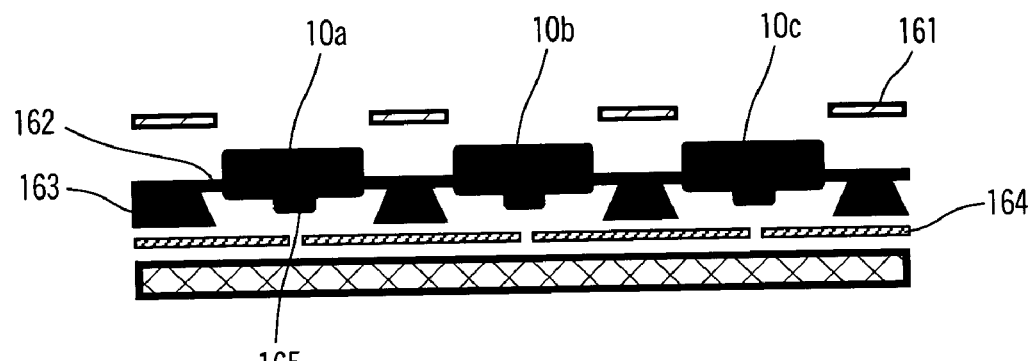
FIG. 16a shows an expanded cross-sectional view of the keyboard assembly of FIG. 16.
Figure 16B:
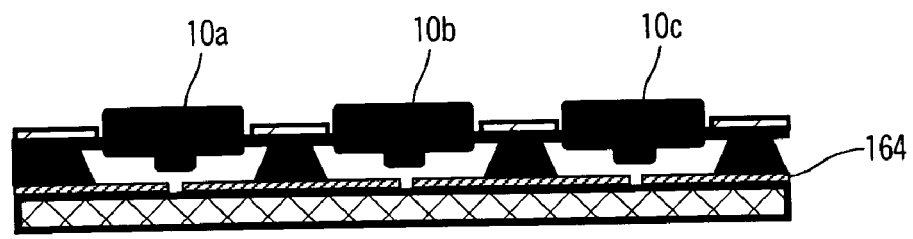
FIG. 16b shows a cross-section of the keyboard of FIG. 16 when assembled. In this embodiment, switching occurs by the use of conductive feet and conductive copper traces as shown in FIG. 16b.

FIG. 16 shows a view of the keys 10*a*–10*c* shown in FIG. 1. In FIG. 16, there is also shown a top face plate (161) which provides for separation of the keys and rigidity along the top surface of the keyboard. The keys 10*a*, 10*b*, 10*c* are connected together by an interstitial membrane material (162). Beneath a central portion of each membrane interstice is a support (163). In the embodiment shown in FIG. 16, copper traces (164) are provided for switching. The switching is completed by closure of switches formed by the copper traces by conductive contact feet (165) such as that shown at 10*a* in cross-sectional FIG. 16*a*. When the keyboard assembly is finally assembled, the membrane supports (163) provide support for the membrane (162) and the top face plate (161) as shown in FIG. 16*b*. However, the keys 10*a*, 10*b*, 10*c* do not engage copper traces (164) until they are depressed. The keys in FIG. 16*b* are shown in the non-depressed state. In this embodiment, the connecting membrane provides for return of the keys to the position of non-contact. Similar membrane and membrane supports may be used in the other embodiments of this invention to provide for spacing when keys are not depressed, and to provide a return action to return the keys to the non-depressed position after being pressed.

The three-position and six-position key actuated switches of this invention comprise keys which are depressed to actuate switch contacts as shown in the preferred embodiments. Although the key actuated switches are disclosed for use in a keyboard, they may also be used in other applications such as control switches for many uses such as appliances, automotive dashboards, or for any other electrically controlled device. They may also be used for any other information input device and they are not limited to use with keyboards.

Although three-position keys and six-position keys are shown as the preferred embodiments of this invention, other numbers of positions can be constructed using the teachings of this invention. A three-position key may be converted into a four-position key by adding another group of feet having a fourth height to provide a third tilt axis in parallel with the two shown in the preferred embodiments. A key with five positions may be constructed by deleting one of the five tilt axes shown in the preferred embodiments of six-position keys. A key with two positions may be constructed by deleting one tilt axis from any of the three-position key embodiments. Keys having more than six positions may be constructed following the principles set forth in the preferred embodiments.

The invention claimed is:

1. A reduced size keyboard for touch typing letters, the reduced size keyboard comprising:
   eight keys which collectively include letters A through Z thereon to permit all of the letters to be accessed by eight fingers of a user without having to operate more than one of the keys with any one finger;
   a predetermined standard QWERTY arrangement of the letters on the eight keys with the letters generally assigned to three rows across the eight keys and predetermined ones of the keys having multiple letters arranged in a generally columnar arrangement thereon; and
   a distinct activation position for each letter arranged consistently with the predetermined standard QWERTY arrangement so that the keys including multiple letters thereon allow the user's fingers to move or direct an actuation force on the multiple letter keys in a manner generally corresponding to finger movements used for touch typing with standard QWERTY keyboards without requiring that any one of the user's fingers operate more than one of the keys for touch typing of the letters with the eight keys, wherein at least one of the eight keys has at least six of the distinct activation positions.

2. The reduced size keyboard of claim 1 wherein the at least one of the eight keys includes a pair of centrally disposed, generally adjacent keys with each key in the pair having six letters thereon and six corresponding distinct activation positions so that the user's index fingers each can type six letters via the corresponding one of the pair of six-letter keys without having to operate another key.

3. The reduced size keyboard of claim 1 wherein the at least one of the eight keys includes a pair of centrally disposed, generally adjacent keys that are of a different size than a plurality of the other of the eight keys.

4. The reduced size keyboard of claim 3 wherein the pair of keys are each wider in a lateral direction to have a larger number of letters and corresponding distinct activation positions than the plurality of the other of the eight keys.

5. The reduced size keyboard of claim 1 wherein the predetermined ones of the keys each have opposite ends thereof, an intermediate recessed surface, and raised surfaces extending between the recessed surface and the opposite key ends to provide a tactile indication to the user that the fingers that operate the predetermined ones of the keys are in a touch typing home position when engaged on the recessed surfaces of the keys.

6. The reduced size keyboard of claim 5 wherein the recessed surfaces arid raised surfaces of the predetermined ones of the keys have a substantially flat configuration.

7. The reduced size keyboard of claim 1 wherein the eight keys each include at least one adjacent key, and
a standard interkey spacing between centers of the adjacent keys to allow touch typing with the eight keys without the fingers interfering with one another or any one finger pressing two keys simultaneously.

8. The reduced size keyboard of claim 7 wherein the standard interkey spacing is approximately ¾ of an inch.

9. The reduced size keyboard of claim 1 wherein the keys include structure for providing the distinct activation positions to allow unambiguous input of a single letter via a single keystroke with any one of the eight keys.

10. The reduced size keyboard of claim 9 wherein the key structure includes multiple pivot axes about which the keys are pivotal so that pivoting one of the keys in one direction about one pivot axis inputs one of the key's letters and not any other letter or letters of the key, and pivoting in another direction about another one of the pivot axes inputs another one of the key's letters and not any other letter or letters of the key.

11. The reduced size keyboard of claim 1 wherein the keys include structure so that the distinct activation positions are mutually exclusive to preclude input of multiple letters via a single keystroke with any one of the eight keys.

12. The reduced size keyboard of claim 1 wherein the eight keys have a linear, side-by- side arrangement thereof.

13. The reduced size keyboard of claim 1 wherein the general assignment of letters to three rows comprises three single rows of letters so that each of the linear rows contain letters in a side-by-side arrangement thereof.

14. A reduced size keyboard for touch typing letters, the reduced size keyboard comprising:
eight keys which collectively include letters A through Z thereon;
a first group of four of the eight keys arranged in a row for being operated by four fingers on a left hand of a user without having to operate more than one of the keys with any one finger;
a second group of four of the eight keys arranged in a row for being operated by four fingers on a right hand of a user without having to operate more than one of the keys with any one finger;
a predetermined standard QWERTY arrangement of the letters on the eight keys so that a plurality of the keys in both groups have multiple letters in a generally columnar arrangement thereon and the plurality of keys include a predetermined key from each group that also has letters arranged laterally adjacent to each other thereon; and
a distinct activation position for each letter arranged consistently with the predetermined standard QWERTY arrangement so that the plurality of keys including multiple letters thereon allow the user's fingers on both the left and right hands to move or direct an actuation force on the multiple letter keys in a manner generally corresponding to finger movements used for touch typing with standard QWERTY keyboards without requiring that any one of the user's fingers on either hand operate more than one of the keys for touch typing of the letters with the eight keys, wherein at least one of the predetermined keys has at least six of the distinct activation positions.

15. The reduced size keyboard of claim 13 wherein the predetermined key from each group has six letters thereon and six corresponding distinct activation positions so that the user's fingers on their left and right hands operating the six-letter keys can touch type the six letters therewith without having to operate another key.

16. The reduced size keyboard of claim 13 wherein the four keys of the first group are laterally adjacent and are spaced by a standard interkey spacing between centers thereof that does not have to be traversed by any one of the four fingers on the user's left hand during touch typing, and the four keys of the second group are laterally adjacent and are spaced by the standard interkey spacing between centers thereof that does not have to be traversed by any one of the four fingers on the user's right hand during touch typing.

17. The reduced size keyboard of claim 15 wherein the distinct activation position for each letter is spaced on the multiple letter keys so that adjacent activation positions on any one of the multiple letter keys are spaced closer to each other than the standard interkey spacing.

18. The reduced size keyboard of claim 16 wherein the standard interkey spacing is approximately ¾ of an inch.

19. The reduced size keyboard of claim 13 wherein the predetermined key from the first group is laterally adjacent to the predetermined key from the second group.

20. The reduced size keyboard of claim 13 wherein the respective rows for the first and second groups of keys extend linearly in one generally continuous row.

* * * * *

UNITED STATES PATENT AND TRADEMARK OFFICE
CERTIFICATE OF CORRECTION

| | |
|---|---|
| PATENT NO. | : 7,131,780 B2 |
| APPLICATION NO. | : 10/650825 |
| DATED | : November 7, 2006 |
| INVENTOR(S) | : Steven B. Hirsch |

Page 1 of 1

It is certified that error appears in the above-identified patent and that said Letters Patent is hereby corrected as shown below:

Claim 6, column 15, line 4 change "arid" to --and--.

Signed and Sealed this

Twenty-seventh Day of March, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,131,780 B2 | |
| APPLICATION NO. | : 10/650825 | |
| DATED | : November 7, 2006 | |
| INVENTOR(S) | : Steven Hirsch | |

It is certified that error appears in the above-identified patent and that said Letters Patent is hereby corrected as shown below:

Please add the claim 15 through 20:

Col. 16 Line 19-24
15. The reduced size keyboard of claim ~~13~~ 14 wherein the predetermined key from each group has six letters thereon and six corresponding distinct activation positions so that the user's fingers on their left and right hands operating the six-letter keys can touch type the six letters therewith without having to operate another key.

Col. 25 Line 16-33
16. The reduced size keyboard of claim ~~13~~ 14 wherein the four keys of the first group are laterally adjacent and are spaced by a standard interkey spacing between centers thereof that does not have to be traversed by any one of the four fingers on the user's left hand during touch typing, and the four keys of the second group are laterally adjacent and are spaced by the standard interkey spacing between centers thereof that does not have to be traversed by any one of the four fingers on the user's right hand during touch typing.

Col. 16 Line 34-39
17. The reduced size keyboard of claim ~~15~~ 16 wherein the distinct activation position for each letter is spaced on the multiple letter keys so that adjacent activation positions on any one of the multiple letter keys are spaced closer to each other than the standard interkey spacing.

Col. 16 Line 40-41
18. The reduced size keyboard of claim ~~16~~ 17 wherein the standard interkey spacing is approximately 3/4 of an inch.

Col. 16 Line 42-44
19. The reduced size keyboard of claim ~~13~~ 14 wherein the predetermined key from the first group is laterally adjacent to the predetermined key from the second group.

UNITED STATES PATENT AND TRADEMARK OFFICE
CERTIFICATE OF CORRECTION

| | |
|---|---|
| PATENT NO. | : 7,131,780 B2 |
| APPLICATION NO. | : 10/650825 |
| DATED | : November 7, 2006 |
| INVENTOR(S) | : Steven Hirsch |

It is certified that error appears in the above-identified patent and that said Letters Patent is hereby corrected as shown below:

Col. 16 Line 45-77
20. The reduced size keyboard of claim ~~13~~ 14 wherein the respective rows for the first and second groups of keys extend linearly in one generally continuous row.

Signed and Sealed this

Seventh Day of October, 2008

JON W. DUDAS
*Director of the United States Patent and Trademark Office*